(12) United States Patent  (10) Patent No.: US 8,356,878 B2
Iu et al.  (45) Date of Patent: Jan. 22, 2013

(54) METHOD OF PRINTING IMAGES (75) Inventors: Kai-Kong Iu, San Diego, CA (US);
Brian E. Curcio, San Diego, CA (US);
Ryan Tung Vu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 117 days.

(21) Appl. No.: 13/112,943

(22) Filed: May 20, 2011

(65) Prior Publication Data

US 2012/0293574 A1  Nov. 22, 2012

(51) Int. Cl.
*B41J 29/393* (2006.01)
(52) U.S. Cl. .............................. 347/19; 347/9; 347/100
(58) Field of Classification Search ................ 347/9, 14, 347/15, 19, 20, 95, 100, 101
See application file for complete search history.

(56) References Cited

U.S. PATENT DOCUMENTS

| | | | |
|---|---|---|---|
| 5,867,632 A | 2/1999 | Andree et al. | |
| 6,719,421 B2 | 4/2004 | Tyvoll | |
| 7,479,179 B2 | 1/2009 | Szajewski | |
| 8,267,498 B1 * | 9/2012 | Blair et al. | 347/19 |
| 2004/0061756 A1 | 4/2004 | Kelly-Rowley et al. | |
| 2007/0142522 A1 | 6/2007 | Uerz et al. | |
| 2008/0044633 A1 | 2/2008 | Ming et al. | |
| 2009/0195579 A1 | 8/2009 | Tousi et al. | |
| 2010/0003409 A1 | 1/2010 | Rao et al. | |
| 2010/0055421 A1 | 3/2010 | Carmody et al. | |
| 2010/0068387 A1 | 3/2010 | Gibson et al. | |
| 2010/0221460 A1 | 9/2010 | Wexler et al. | |

* cited by examiner

*Primary Examiner* — Juanita D Jackson (57) ABSTRACT

A method of printing an image includes co-dispensing a compensation vehicle and an ink from an ink set to sites on a printing medium to form a printed image. A combined amount of the ink and the compensation vehicle dispensed to each site is at least substantially equal to a minimum site value that is predetermined for the ink set and the printing medium. The method further includes applying an amount of an overcoat liquid to the printed image to obtain a predetermined ratio of gloss to haze.

20 Claims, 5 Drawing Sheets

METHOD OF PRINTING IMAGES

CROSS-REFERENCE TO RELATED APPLICATIONS

N/A

STATEMENT REGARDING FEDERALLY SPONSORED RESEARCH OR DEVELOPMENT

N/A

BACKGROUND

Many physical locations exist for individuals to print pictures from digital images. These locations are sometimes referred to as "photo kiosks" where customers can interact with a printer to print pictures. The photo kiosks are located in many public areas that are convenient for the customer such as, for example, malls, department stores, convenience stores, hotels, cafeterias, train stations, and airports. The photo kiosks are equipped with printers that carry out the function of converting a customer's digital data into photographic prints in a relatively short period of time.

BRIEF DESCRIPTION OF THE DRAWINGS

The drawings provided herein are not to scale and are provided for the purpose of facilitating the understanding of certain examples in accordance with the principles described herein and are provided by way of illustration and not limitation on the scope of the appended claims.

DETAILED DESCRIPTION

Many customers desire photographic prints as an end product that have an appealing level of gloss and haze. In some current printer systems employed in photo kiosks, which are pigment inkjet systems, appealing levels of gloss and haze are achieved by the printer's use of relatively large amounts of an overcoat liquid to create the finished product. The problem with such an approach is that such large amounts of overcoat liquid greatly increase the drying time and the overall cost of the finished product. Other approaches to achieving acceptable levels of gloss and haze such as, for example, dye porous printing and lamination, are flawed as both are costly and possess technical difficulties.

Examples in accordance with the principles described herein provide methods of printing that reduce the amount of an overcoat liquid used to obtain acceptable and uniform ratios of gloss to haze from a particular ink set and a particular printing medium. A compensation vehicle is dispensed to sites on a printing medium so that a total amount of liquid (ink plus compensation vehicle) at each site is at least equal to a minimum amount of liquid for all sites to be printed on the printing medium. The overcoat liquid is applied thereafter in an amount that is just sufficient to obtain an acceptable ratio of gloss to haze. As a result, the overall amount of overcoat liquid that is employed is reduced over an amount that would be necessary without use of the compensation vehicle. Use of a compensation vehicle dispensed at approximately the same time as the ink involves printing under wet-on-wet conditions. As a result of the methods exemplified herein, cost and processing time for the printing process are reduced while still obtaining ratios of gloss to haze that are acceptable to a customer.

In some examples in accordance with the principles described herein, a method of printing an image comprises co-dispensing a compensation vehicle and an ink from an ink set to sites on a printing medium to form a printed image. A combined amount of the ink and the compensation vehicle dispensed to each site is at least substantially equal to a minimum site value that is predetermined for the ink set and the printing medium. Thereafter, an amount of an overcoat liquid is applied to the printed image to obtain a predetermined ratio of gloss to haze. In some examples, the amount of the overcoat liquid is a minimum amount.

In some examples in accordance with the principles described herein, a method of controlling a gloss to haze ratio for a printed image comprises adjusting an amount of a compensation vehicle co-dispensed with an ink to sites on a printing medium during the formation of the printed image. In some examples, an increase in the amount of compensation vehicle co-dispensed with the ink results in an increase in the gloss to haze ratio. A method of reducing an amount of overcoat liquid applied to a printed image to achieve a predetermined ratio of gloss to haze includes controlling the gloss to haze ratio, and applying an amount of the overcoat liquid to obtain the predetermined ratio.

In some examples in accordance with the principles described herein, depending on a targeted gloss to haze ratio and a targeted amount of an overcoat liquid to be employed in an overcoating process carried out at the time of printing (for example, at a photo-kiosk), an amount of overcoat liquid applied can be equal to or less than a predetermined amount of overcoat liquid or equal to or less than an amount of overcoat liquid utilized in a calculation of a minimum site value in accordance with the principles described herein. This attribute offers a customer the ability to choose a gloss to haze ratio that is acceptable to the customer and commensurate with a particular price for the printed image. The amount of overcoat liquid that is dispensed when a compensation vehicle is employed can be equal to or less than the predetermined overcoat liquid amount utilized in the calculation of a minimum site value. Such flexibility is enabled by co-dispensing a compensation vehicle with ink during a printing process.

The term "co-dispensing" or "co-dispensed" means that both compensation vehicle and ink composition (i.e., 'ink') are dispensed to the same site on a printing medium at approximately the same time. In some examples in accordance with the principles described herein, the compensation vehicle is dispensed to a site at the same time that the ink composition is dispensed to the site. The phrase "approximately the same time" means that the ink composition and the compensation vehicle are dispensed to the same site on the printing medium within about five seconds or less, or within about four seconds or less, or within about three seconds or less, or within about two seconds or less, or within about one second or less, for example. The compensation vehicle may be contained in its own reservoir or dispenser of a printing device. The manner in which the ink is dispensed is based on the nature of the printing device. For example, for an inkjet printer, ink is dispensed from a print head as droplets to a surface of a printing medium.

The phrase "substantially equal to the minimum site value" means that the total amount of ink and compensation vehicle at a site is equal to the minimum site value or is greater than or less than the minimum site value by about 1%, or about 2%, or about 3%, or about 4%, or about 5%, or about 6%, or about 7%, or about 8%, or about 9%, or about 10%, for example.

The term "gloss" refers to the capacity of a surface to directly reflect light impinged on the surface. Gloss is often used as a criterion to evaluate the quality of a printed image because of the importance of an aesthetic appearance of the printed image. Gloss affects the observer of a printed image in a positive manner and thus, higher gloss levels tend to be desirable to a consumer. Gloss is measured at certain specific angles or specular angles since the intensity of reflected light is dependent on the angle of illumination and on the nature of the surface that is illuminated. In some examples, illumination is carried out at a specular angle of about 20°, or about 60°, or about 85°. The most common angle of illumination in the industry for gloss study is 20° for both incident light beam and receiving angle. Gloss may be measured using, by way of illustration and not limitation, a glossometer, a reflectometer, or a MICRO-HAZE PLUS® portable haze meter (BYK-Garner GmbH, Wesel, Germany), for example.

The phrase "haze" refers to scattered or diffused light rather than directly reflected light. Haze affects the observer of a printed image in a negative manner and thus, lower haze levels tend to be desirable to a consumer. Haze may be measured using, by way of illustration and not limitation, a reflectometer, or the MICRO-HAZE PLUS® portable haze meter, for example. In many examples, haze is measured at approximately 1.8° off-specular. This means that, for a 20° incident light beam, the reflection intensity is measured at a 21.8° or 18.2° receiving angle. In the examples described below, the values reported for haze are defined as "log haze" and are proprietary to the MICRO-HAZE PLUS® portable haze meter by a formula that converts the reflected light intensity at 1.8° off-specular to a number in the ranges shown in the figures described below.

The phrase "ratio of gloss to haze" refers to the measured gloss divided by the measured haze for a particular angle of illumination. The phrase "predetermined ratio of gloss to haze" refers to a ratio of gloss to haze that is determined to be acceptable or targeted for a particular ink set and a particular printing medium as well as a particular overcoat liquid. The predetermined ratio of gloss to haze for acceptable gloss quality is dependent on, for example, the distribution of observers of the image. In most instances, the higher the ratio of gloss to haze, the more appealing is the printed image to the observer. Particular ratios are dependent on the measurement system employed for the measurements. In some examples, the predetermined ratio of gloss to haze will be greater than about 0.35, or greater than about 0.40, or greater than about 0.45, or greater than about 0.50, or greater than about 0.55, or greater than about 0.60, for example. For the examples below, the BYK-Gardner instrument for log-haze is used by way of illustration and not limitation. The acceptable predetermined ratio of gloss to haze may change with non-BYK-Gardner instrumentation. That is, in some instances higher ratios may not be good enough and lower ratios will be acceptable, which depends on the measurement system used.

The phrase "minimum site value" refers to a minimum amount of liquid that must be present at sites on a printing medium so that subsequent application of a minimized amount of an overcoat liquid achieves an acceptable ratio of gloss to haze for a printed image. In some instances, the minimum site value provides for one or both of a more uniform layer and solids density for overcoating. The phrase "solids density" refers to the solids residue left at a site after removal of volatile materials such as, for example, by drying.

The minimum site value is predetermined for a particular ink set and printing medium. The determination of the minimum site value is carried out independent of the operations that a customer carries out at a photo kiosk. The minimum site value for an ink set and a printing medium is predetermined so that information concerning the minimum site value may be employed to develop a set of operating instructions for a printer, which will use the ink set and the printing medium for printing image prints for the customer.

In an example of one approach in accordance with the principles described herein, a minimum site value is predetermined by a method that employs an ink set and a printing medium to be employed by a printer at the photo kiosk. Ink from an ink set is dispensed to the printing medium to form a test printed image comprising sites of different light and dark colors, which differ by the total amount of ink dispensed to each site. An amount of an overcoat liquid is applied to the test printed image that is just sufficient to obtain a predetermined ratio of gloss to haze for at least 40% of the sites, or at least 45% of the sites, or at least 50% of the sites, or at least 55% of the sites, or at least 60% of the sites, or at least 65% of the sites, or at least 70% of the sites but no more than about 90% of the sites, for example. In some examples, the number of sites exhibiting the predetermined ratio of gloss to haze is within the range of about 40% to about 90%. An amount of ink at a site that first exhibits the predetermined ratio of gloss to haze is measured wherein the amount of ink is equal to the minimum site value and wherein consecutive sites thereafter exhibit a ratio of gloss to haze that differs by no more than about 20%, or by no more than about 15%, or by no more than about 10%, or by no more than about 5%, from the predetermined ratio of gloss to haze.

The phrase "test printed image comprising sites of different light and dark colors" refers to a printed image that comprises a sufficient number of sites having varying total amounts of ink per site due to the formation of different colors that also differ by hue and intensity, for example.

The number of sites having different light and dark colors should be sufficient to provide a standardization of image quality for printing systems with regard to perception of the acceptable or desirable ratios of gloss to haze. In some examples, the number of sites is about 36 to about 100, or about 40 to about 60, or about 40 to about 50.

In some examples, the test printed image comprising sites of different light and dark colors is an International Standards Organization (ISO) gloss uniformity target, which provides a standardization of image quality for printing systems with regard to perception of the acceptable or targeted ratios of gloss to haze. One such ISO gloss uniformity target comprises a matrix of 40 colors on a target plot where colors were intended to be equally representative of the full photo color gamut. The colors are defined in L-a-b, RGB and CMYK color spaces. Neither the size of the target plot nor the size of the color sites is important with regard to the studies described herein. Any size target plot and color sites may be employed as long as the measurement instrument can measure gloss and haze of the printed color image.

Figure 1:
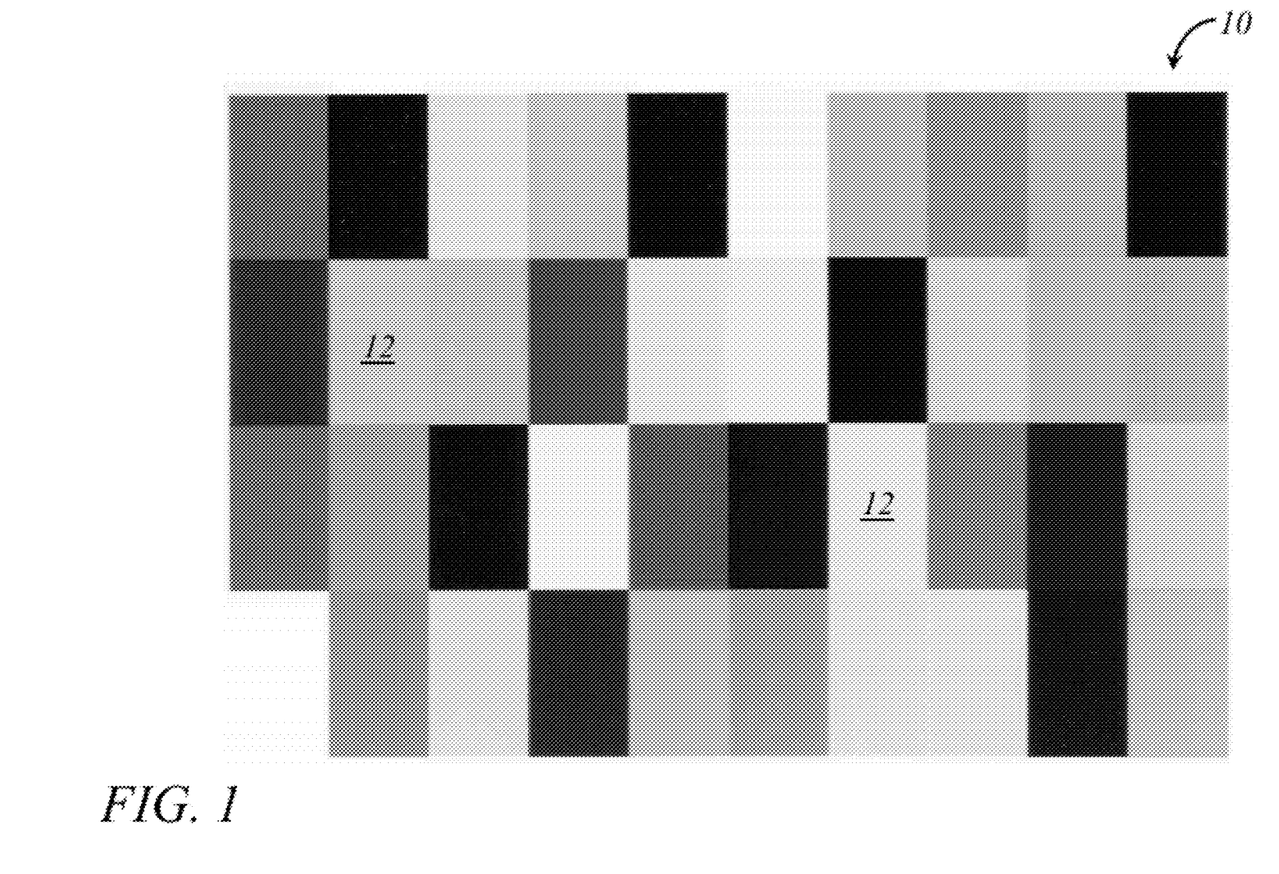
FIG. 1 is an example of a color matrix that may be printed either in accordance with the principles described herein or for purposes of comparison.

FIG. 1 is an example of a color matrix that may be printed either in accordance with the principles described herein or for purposes of comparison. In general, a matrix of forty total sites 12, each having a size of 1 inch×0.5 inches, on a grid that is 4×10 may be printed using an ink set comprising five different inks (light cyan, magenta, yellow, grey and light magenta) on a suitable printing medium, for example a medium that is employed for printing of glossy printed images such as photographic quality paper. A matrix 10 of light and dark colors (shown in shades of black and white in FIG. 1) is produced where an ink bit value for each of the sites is determined by the nature and intensity of the color as explained more fully herein. Overcoat liquid is applied to the test printed image in an amount that gives all of the color sites a gloss of about 85 (measured at a 20° specular angle) and a haze of about 210 (measured at a 20° specular angle), for example. This amount of overcoat liquid is 360 ng/300 dots per inch (dpi or DPI) and may be referred to herein as the "non-compensation vehicle overcoat liquid amount."

It should be noted that the phrase "ink bit value" as used herein refers to a unit-less number that may be converted to an amount of ink per site (or vice versa, i.e., the ink per site amount may be converted to an ink bit value) where the amount of ink in weight or volume is determined based on resolution (for example, 1200×1200 DPI, 600×600 DPI, 300×300 DPI). Ink bit values are used in color maps to adjust the amount of ink that is actually deposited per site. Amounts of ink distributed to each site for a particular ink set to provide a desired color is determined using color maps to convert RGB data into ink data. Each site in an image is defined by an RGB triplet. Each RGB triplet is separated or mapped into a particular ink set. Linearization may then be used to adjust ink amounts where output ink amounts are plotted against input amounts from the color map. Linearization curves are typically generated by a calibration system on board a printer. The ink amounts are also subjected to halftoning. The value for the amount of ink per site will change depending on the halftones and linearization used. For example, if a two-drop halftone table is employed, the maximum amount of ink that can be deposited is 2 drops/1200 DPI site. Assuming a drop weight of 4 ng per drop, 8 ng of ink per 1200 DPI site may be deposited, which is equivalent to 32 ng per 600 DPI site or 128 ng per 300 DPI site. The amount of ink applied may be ascertained from an ink bit value.

As mentioned above, one example of a method of predetermining a minimum site value comprises dispensing ink from an ink set to a printing medium to form a test printed image comprising sites of different light and dark colors; and applying an amount of the overcoat liquid to the test printed image that is just sufficient to obtain a predetermined ratio of gloss to haze for at least 40% of the sites. An amount of the ink at a site that first exhibits the predetermined ratio of gloss to haze (the first site) is determined wherein consecutive sites after the first site exhibit a ratio of gloss to haze that differs by no more than about 20% from the predetermined ratio of gloss to haze and wherein the minimum site value is determined from the amount of ink at the site.

An example by way of illustration and not limitation of predetermining a minimum site value for an ink set and a printing medium is described next with reference to the drawings. Another matrix 10 (see FIG. 1) is printed (test printed image) as described above. In this example, overcoat liquid is applied to the test printed image in an amount that is just sufficient to give about 65% of the color sites a 20° gloss of about 85 and a 20° log-haze of about 210. This amount of overcoat liquid is 270 ng/300 dpi. The overcoat liquid is applied uniformly to cover the test printed image and may be applied in one or more passes of an overcoat applicator, which may be part of a printer.

Figure 2:
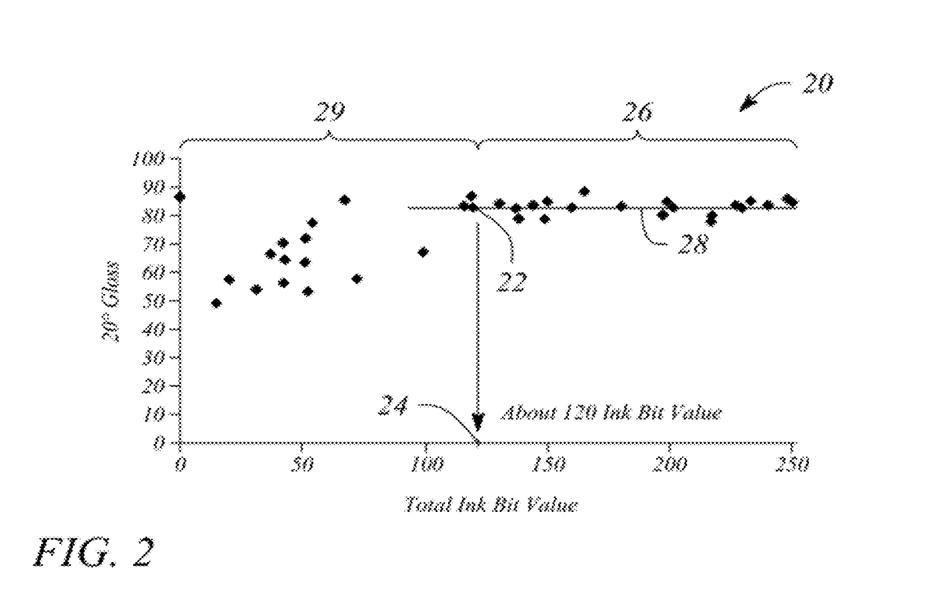
FIG. 2 is a graph in which 20° gloss is plotted against total ink bit value for a color matrix of FIG. 1 for the purposes of ascertaining a minimum ink bit value in an example in accordance with the principles described herein.
Figure 3:
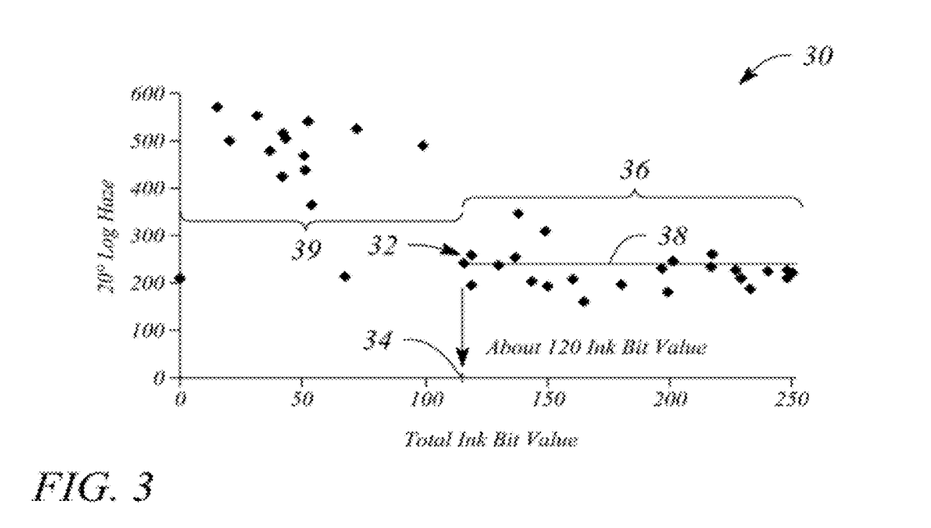
FIG. 3 is a graph in which 20° log-haze is plotted against total ink bit value for a color matrix of FIG. 1 for the purposes of ascertaining a minimum ink bit value in an example in accordance with the principles described herein.

FIG. 2 illustrates a graph 20 that is produced wherein 20° gloss is plotted against total ink bit value for each site of the 40 sites, which correspond to the 40 sites of matrix 10 of FIG. 1. An amount of ink at site 22, which is the first site of a number of consecutive sites to consistently exhibit the predetermined level of 20° gloss, is measured wherein the ink bit value 24 of about 120, for example, is equal to the minimum site value. FIG. 3 illustrates a graph 30 that is also produced wherein 20° haze is plotted against total ink bit value for each site of the 40 sites in an example in accordance with the principles described herein. An amount of ink at site 32, which is the first site of a number of consecutive sites to consistently exhibit the predetermined level of 20° haze, is measured wherein the ink bit value 34 of about 120 (e.g., the amount of ink 34 equal to about 120 ng/1200×1200 DPI) is equal to the minimum site value.

Referring back to FIG. 2, for example, site 22 that first consistently exhibits the predetermined level of gloss is a site where consecutive sites in bracket 26 thereafter exhibit substantially the same level of gloss. Moreover, with reference to FIG. 3, site 32, for example, that first exhibits the predetermined log haze is a site where consecutive sites in bracket 36 thereafter exhibit substantially the same level of log haze. The phrase "substantially the same level" means that the measured value (either gloss or haze) does not differ by more than about 20%, or about 15%, or about 10%, for example, from the measured values at neighboring sites and in some examples, at all sites subsequent to the first site. In the graph of FIG. 2, the 20° gloss level of about 85±5, for example, exhibited by more than 60% of the sites results in a situation in which line 28 may be drawn through the sites where the line is substantially parallel to the x-axis (total ink bit value). In this way there is a substantially linear order of the sites relative to the total ink bit value. The ink bit value at site 22 that first consistently exhibits the gloss level of about 85±5 is about 120, which is selected as the minimum site value in accordance with the principles described herein.

A similar situation exists for haze measurements. As indicated above, FIG. 3 depicts graph 30 wherein 20° haze is plotted against total ink bit value for each site. In graph 30 of FIG. 3, a haze level of about 210±10, for example, exhibited by more than 60% of the sites results in a situation where line 38 may be drawn through the sites that is substantially parallel to the x-axis (total ink bit value). The ink bit value at site 32 that first consistently exhibits a log haze level of about 210±10 is about 120, which is selected as the minimum site value in accordance with the principles described herein.

Therefore, in the example described above, a minimum ink bit value at first site 22 in the measurement of gloss and at first site 32 in measurement of haze is about 120. A minimum site value can be selected in view of this minimum ink bit value. The minimum site value is at least equal to this minimum ink bit value or is greater than or less than this minimum ink bit value by no more than about 30%, or no more than about 25%, or no more than about 20%, or no more than about 15%, or no more than about 10%, or no more than about 5%, for example. In the example above, a minimum site value of 130 is chosen, which is greater than the minimum ink bit value by about 8%.

In accordance with the principles described herein, in the above example the minimum site value of 130 is used to determine the amount of compensation vehicle that is co-dispensed to a site along with an amount of ink to form a printed image. For sites in bracket 29 of the graph 20 of FIG. 2 (based on the printed image) that receive less than the minimum site value of 130, an amount of compensation vehicle is dispensed to the site so that the amount of ink plus the amount of compensation vehicle is equal to at least 130, the minimum site value. For sites in bracket 39 of the graph 30 of FIG. 3 (based on the printed image) that receive less than the minimum site value of 130, an amount of compensation vehicle is dispensed to the site so that the amount of ink plus the amount of compensation vehicle is equal to at least 130, the minimum site value.

Figure 4:
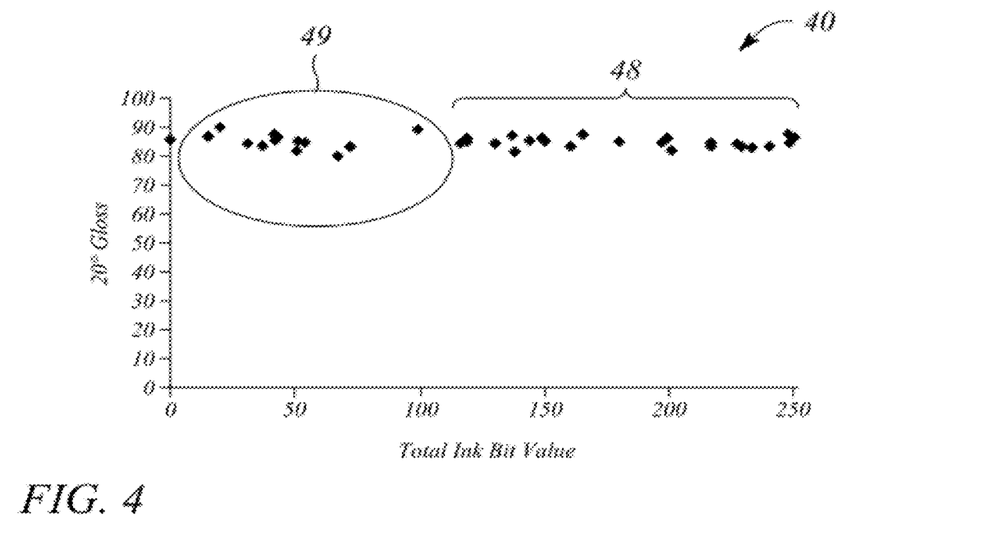
FIG. 4 is a graph in which 20° gloss is plotted against total ink bit value for a color matrix of FIG. 1 printed using a compensation vehicle co-dispensed with ink, wherein the total ink bit value does not include a bit value of the compensation vehicle, in an example in accordance with the principles described herein.
Figure 5:
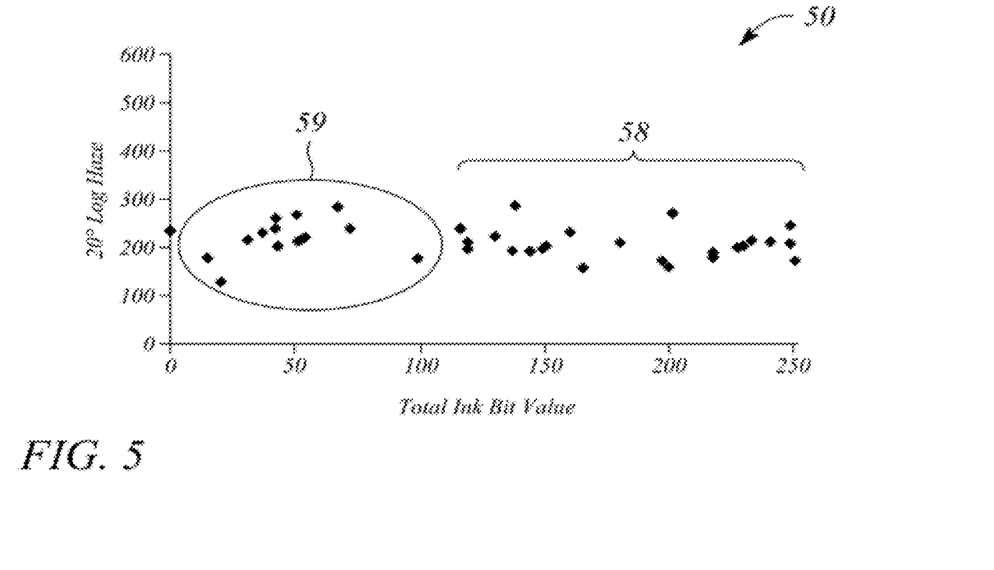
FIG. 5 is a graph in which 20° log-haze is plotted against total ink bit value for a color matrix of FIG. 1 printed using a compensation vehicle co-dispensed with ink, wherein the total ink bit value does not include a bit value of the compensation vehicle, in an example in accordance with the principles described herein.

After the printed image is printed using ink and compensation vehicle in accordance with the principles described herein and subsequently is dried, an amount of overcoat liquid (referred to as the "compensation vehicle overcoat liquid amount") is applied to the printed image. The amount of overcoat liquid applied is substantially the same as the amount of overcoat liquid applied to the test printed image above for the determination of the minimum site value. The phrase "substantially the same as" means that the amount of overcoat liquid is equal to the amount of overcoat liquid applied to the test printed image or greater than or less than that amount by about 100%, or by about 90%, or by about 80%, or about 70%, or by about 60%, or by about 50%, or about 40%, or by about 30%, or by about 20%, or by about 10%. FIGS. 4 and 5 illustrate graphs of gloss and haze respectively, plotted against total ink bit value for compensation vehicle and ink in examples in accordance with the principles described herein. Each graph, the total ink bit value does not include a bit value of the compensation vehicle. As can be seen in graph 40 in FIG. 4 and graph 50 in FIG. 5, all of the sites printed including those sites within circles 49 and 59, respectively, printed using compensation vehicle in accordance with the principles described herein exhibit substantially the same level of 20° gloss (about 85) and substantially the same level of 20° haze (about 210) as the sites within brackets 48 and 58, respectively. Sites within circles 49 and 59 correspond to sites within brackets 29 and 39, respectively, of FIGS. 2 and 3, which did not exhibit substantially the same level of gloss and haze without employing the compensation vehicle in accordance with the principles described herein. Thus, the amount of overcoat liquid needed when an image is printed in accordance with the principles described herein is less than the non-compensation vehicle overcoat liquid amount by about 25%.

In an example of another approach in accordance with the principles described herein, a minimum site value is predetermined by a method that employs an ink set and a printing medium to be employed by a printer at the photo kiosk. Ink from the ink set and a compensation vehicle are co-dispensed to the printing medium to form a test printed image comprising sites of different light and dark colors. In this approach an assumed value for the minimum site value is selected. For all ink sites with less than the minimum site value, the compensation vehicle will be dispensed in the amount that is the difference of the minimum site value and the ink value. A predetermined amount of overcoat liquid is applied to the test printed image and a gloss to haze ratio is determined for the printed image. If the printed image exhibits a predetermined ratio of gloss to haze, the assumed minimum site value is chosen as the minimum site value. On the other hand, if the printed image does not exhibit a predetermined ratio of gloss to haze, the aforementioned steps are repeated using an assumed minimum site value that is adjusted higher or lower than the assumed minimum site value previously selected.

In the above example, the minimum site value is predetermined by a method that comprises co-dispensing ink from the ink set and the compensation vehicle to the printing medium to form a test printed image comprising sites of different light and dark colors wherein an assumed value for the minimum site value is selected and wherein, for all sites with less than the minimum site value, the compensation vehicle is dispensed in an amount that is the difference of the minimum site value and the ink. The method further comprises applying a predetermined amount of overcoat liquid to the test printed image, and determining a gloss to haze ratio for the printed image. If the printed image exhibits a predetermined ratio of gloss to haze, the method further comprises choosing the assumed minimum site value as the minimum site value, or if the printed image does not exhibit a predetermined ratio of gloss to haze, the method further comprises repeating the aforementioned steps, wherein the assumed minimum site value is adjusted higher or lower.

In an example of another approach in accordance with the principles described herein, a minimum site value is predetermined by a method that employs an ink set and a printing medium to be employed by a printer at the photo kiosk. Ink from the ink set is dispensed to the printing medium to form test printed images comprising sites of different light and dark colors. Decreasing incremental amounts of overcoat liquid are applied to each of the test printed images to determine a first overcoated test printed image that exhibits a lack of a predetermined ratio of gloss to haze for at least 30%, or at least 35%, or at least 40% of the sites but no more than about 80%, or no more than about 90% of the sites. The amount of overcoat liquid for this first overcoated test printed image represents a predetermined amount of overcoat liquid. An amount of the ink at a first site that exhibits the predetermined ratio of gloss to haze wherein consecutive sites after the first site exhibit a ratio of gloss to haze that differs by no more than about 20%, or no more than about 15%, or no more than about 10% from the predetermined ratio of gloss to haze is determined. The minimum site value is determined from the amount of ink at the first site.

In the above example, the minimum site value is predetermined by a method that comprises dispensing ink from an ink set to the printing medium to form test printed images comprising sites of different light and dark colors. The method further comprises applying decreasing incremental amounts of overcoat liquid to each of the test printed images to determine a first overcoated test printed image that exhibits a lack of a predetermined ratio of gloss to haze for at least 30% of the sites. The amount of overcoat liquid for the first overcoated test printed image represents a predetermined amount of overcoat liquid. The method further comprises determining an amount of the ink at a first site that exhibits the predetermined ratio of gloss to haze wherein consecutive sites after the first site exhibit a ratio of gloss to haze that differs by no more than about 20% from the predetermined ratio of gloss to haze. The minimum site value is determined from the amount of ink at the first site.

As used herein, "ink vehicle" is defined to include any liquid that is used to carry colorants, including pigments, to a printing medium. The ink vehicle comprises water and may comprise a wide variety of liquid vehicle components. In some examples, the ink vehicle may include one or more of a variety of different agents, including without limitation, organic solvents and co-solvents, surfactants, polymeric binders, buffers, biocides, viscosity modifiers, sequestering agents, and stabilizing agents, for example.

The organic solvent is soluble (water soluble) or miscible in water (water miscible). The nature of the organic solvent is dependent, for example, on the nature of the colorant, the nature of the other components of the ink composition, and the nature of the printing system, for example. In some examples, the organic solvent is a polar organic solvent having about 2 to about 50 carbon atoms, or about 10 to about 50 carbon atoms, or about 10 to about 40 carbon atoms, or about 10 to about 30 carbon atoms, or about 10 to about 20 carbon atoms, and further having 1 to about 20 heteroatoms, or about 2 to about 15 heteroatoms, or about 3 to about 10 heteroatoms, for example. The heteroatoms may be in the form of one or more alcohol moieties, ether moieties, ketone moieties, aldehyde moieties, amine moieties, and amide moieties, for example. In some examples, the organic solvent has a boiling point of about 170° C. to about 250° C., for example.

In some examples, the organic solvent is, by way of illustration and not limitation, an alcohol; a polyhydric alcohol; a glycol derivative; an amine; an amide; or other organic solvents such as, for example, dimethylsulfoxide, sulfolane, 2-pyrrolidone, N-methyl-2-pyrrolidone, N-vinyl-2-pyrrolidone, 2-oxazolidone, 1,3-dimethyl-2-imidizolidinone, acetonitrile or acetone. The above-mentioned organic solvents can be used in combination of two or more thereof. In some examples, the organic solvent is a glycol, a glycol ether, an alcohol, or a heterocyclic ketone, or a combination of two or more of the above. In some examples, the organic solvent may be, but is not limited to, 1,2-hexanediol, glycerol propoxylate, triethanol amine, 1-(2-hydroxyethyl)-2-pyrrolidone, di-(2-hydroxyethyl)-5,5-dimethylhydantoin (e.g., DANTOCOL® DHE (Lonza Inc., Allendale N.J.), polyethylene glycol, and diethylene glycol, for example.

An amount of the organic solvent in the ink vehicle is dependent on a number of factors such as, for example, the nature and composition of an ink vehicle, the nature of the intended printing media and the intended market application. In some examples in accordance with the principles described herein, the amount by weight of organic solvent in the ink vehicle is about 10% to about 30%, or about 10% to about 25%, or about 10% to about 20%, or about 10% to about 15%, or about 15% to about 30%, or about 15% to about 25%, or about 15% to about 20%, or about 20% to about 30%, or about 20% to about 25%, or about 25% to about 30%, for example.

A polymeric binder is employed in the ink vehicle to enhance the adhesion of the ink to the printing medium. In some examples in accordance with the principles described herein, the polymeric binder is selected from the group consisting of polyurethanes, polyacrylates, polymethacrylates, styrene maleic anhydride resins, and polyacrylic urethane hybrids, by way of illustration and not limitation. The polyurethanes include, but are not limited to, aliphatic polyurethanes, aromatic polyurethanes, anionic polyurethanes, nonionic polyurethane, aliphatic polyester polyurethanes, aliphatic polycarbonate polyurethanes, aliphatic acrylic modified polyurethanes, aromatic polyester polyurethanes, aromatic polycarbonate polyurethanes, aromatic acrylic modified polyurethanes, aromatic polyester polyurethanes, aromatic polycarbonate polyurethanes, and aromatic acrylic modified polyurethanes, for example, or a combination of two or more of the above. The polyacrylates and polymethacrylates are formed from monomers, which include, but are not limited to, acrylic monomers, such as, for example, acrylate esters, acrylamides, and acrylic acids, and methacrylic monomers, such as, for example, methacrylate esters, methacrylamides, and methacrylic acids, for example. The polyacrylates and polymethacrylates may be a copolymer of an acrylic monomer or a methacrylic monomer and another monomer such as, for example, a vinyl aromatic monomer including, but not limited to, styrene, styrene-butadiene, p-chloromethylstyrene, divinyl benzene, vinyl naphthalene and divinyl naphthalene, for example. The amount of the polymeric binder in the ink vehicle is that amount which provides enhancement of the adhesion of an ink to a printing medium, for example. In some examples, the amount by weight of polymeric binder in the ink vehicle is about 0.2% to about 5%, or about 0.5 to about 5%, or about 1% to about 5%, or about 0.2% to about 1%, or about 0.2% to about 0.5%, or about 0.5% to about 4%, or about 0.5% to about 2%, or about 0.5% to about 1%, for example.

Surfactants include, for example, anionic surfactants such as, for example, sodium dodecylsulfate, sodium dodecyloxysulfonate and sodium alkylbenzenesulfonate; cationic surfactants such as, for example, cetylpyridinium chloride, trimethylcetylammonium chloride and tetrabutylammonium chloride; and nonionic surfactants such as, for example, polyoxyethylene nonylphenyl ether, polyoxyethylene naphthyl ether and polyoxyethylene octylphenyl ether. Other surfactants include, but are not limited to, amphoteric surfactants, silicon-free surfactants, fluorosurfactants, and polysiloxanes, for example. More specific examples of surfactants are those available commercially such as, but not limited to, SURFYNOL® 440 (Air Products and Chemicals, Inc., Allentown Pa.), MEGAFACE® 510 (DIC International (USA), LLC, Parsippany N.J.), for example. The amount of surfactant in the ink vehicle is that which is sufficient to obtain a surfactant effect. In some examples, the amount by weight of surfactant in the ink vehicle is about 0.01% to about 5%, or about 0.1% to about 5%, or about 1% to about 5%, or about 0.01% to about 1%, or about 0.1% to about 1%, or about 0.5% to about 1%, for example.

Biocides act as preservatives and inhibit the growth of microorganisms. The biocide may be any standard biocide compatible with the composition of the ink vehicle, the compensation vehicle or the overcoat liquid. The amount of biocide is an amount that obtains a biocidal effect. In some examples, the amount by weight of biocide in the ink vehicle is about 0.01% to about 2%, or about 0.1% to about 2%, or about 1% to about 2%, or about 0.01% to about 1%, or about 0.1% to about 1%, or about 0.5% to about 1%, for example. Examples of biocides, by way of illustration and not limitation, include 1,2-benzisothizolin-3-one (e.g., PROXEL® GXL (Arch Biocides, Symyma Ga.), KORDEK® MLX (Dow Chemical Company, Midland Mich.), and a benzoate salt, for example.

The balance of the ink vehicle is water. In some examples, the ink vehicle may comprises water in an amount by weight of about 50% to about 95%, or about 50% to about 90%, or about 50% to about 85%, or about 50% to about 80%, or about 50% to about 75%, or about 60% to about 95%, or about 60% to about 90%, or about 60% to about 85%, or about 60% to about 80%, or about 60% to about 75%, or about 70% to about 95%, or about 70% to about 90%, or about 70% to about 85%, or about 70% to about 80%, or about 70% to about 75%, for example.

A printing medium is a substrate that is capable of receiving ink dispensed to a surface of the substrate and on which an image is printed. The substrate may be planar, either smooth or rough, or such other shape that is suitable for the particular purpose for which it is employed. The substrate may be porous or non-porous, semi-rigid or flexible, for example. Planar substrates may be in the form, for example, of a film or sheet by way of illustration and not limitation. The printing medium is a photographic quality material. Examples, by way of illustration and not limitation, of printing media that may be employed in the present examples include paper, plastic substrates (for example, cellulose diacetate, cellulose triacetate, cellulose propionate, cellulose butyrate, cellulose acetate butyrate, nitrocellulose, polyethylene terephthalate, polyethylene, polystyrene, polypropylene, polycarbonate, polyvinyl acetal, and acrylic), and paper laminated with plastic (for example, polyethylene, polypropylene, or polystyrene), for example.

The compensation vehicle is a liquid that is compatible with the vehicle in which the ink is dispensed (ink vehicle). The compensation vehicle does not contain any perceptible levels of colorant or ink. In some examples, one or more components of the compensation vehicle impart good spreading and leveling effect qualities to the compensation vehicle. In some examples in accordance with the principles described herein, the composition of the compensation vehicle may be substantially equivalent to the composition of an ink vehicle of the ink without a colorant. In some examples in accordance with the principles described herein, the compensation vehicle may comprise one or more polymeric binders, one or more organic solvents, one or more surfactants, and one or more biocides, for example.

The phrase "substantially equivalent" means that the components of the compensation vehicle and of the ink vehicle are the same or equivalent and the amounts of such components differ by no more than about 200%, or no more than about 150%, or no more than about 100%, or no more than about 75%, or no more than about 50%, or no more than about 25%, or no more than about 20%, or no more than about 15%, or no more that about 10% from one another.

The polymeric binder of the compensation vehicle may be selected from the list set forth above for the ink vehicle. In accordance with the principles described herein, the polymeric binder has the same chemical composition as the polymeric binder of the ink vehicle. In some examples, an amount of the polymeric binder in the compensation vehicle is related to the amount of the polymeric binder in the ink vehicle and, in some examples, an amount of polymeric binder in the compensation vehicle corresponds to the amount of polymeric binder in the ink vehicle. In some examples, the amount of polymeric binder is about 0.2% to about 5%, or about 0.5 to about 5%, or about 1% to about 5%, or about 0.2% to about 1%, or about 0.2% to about 0.5%, or about 0.5% to about 4%, or about 0.5% to about 2%, or about 0.5% to about 1%, for example.

The organic solvent of the compensation vehicle may be selected from the list of organic solvents set forth above for the ink vehicle. In some examples in accordance with the principles described herein, the organic solvent is the same as that for the ink vehicle but it need not be. An amount of the organic solvent in the compensation vehicle is dependent on a number of factors such as, for example, the nature and composition of the ink vehicle and the amount of organic solvent in the ink vehicle. In some examples, an amount of organic solvent in the compensation vehicle is related to the amount of organic solvent in the ink vehicle and, in some examples, an amount of organic solvent in the compensation vehicle corresponds to the amount of organic solvent in the ink vehicle. In some examples in accordance with the principles described herein, the amount by weight of organic solvent in the compensation vehicle is about 10% to about 30%, or about 10% to about 25%, or about 10% to about 20%, or about 10% to about 15%, or about 15% to about 30%, or about 15% to about 25%, or about 15% to about 20%, or about 20% to about 30%, or about 20% to about 25%, or about 25% to about 30%, for example.

The surfactant of the compensation vehicle may be selected from the list of surfactants set forth above for the ink vehicle. In some examples in accordance with the principles described herein, the surfactant is the same as that for the ink vehicle but it need not be. In some examples, the amount of the surfactant in the compensation vehicle is related to the amount of surfactant in the ink vehicle and, in some examples, the amount of surfactant in the compensation vehicle corresponds to the amount of surfactant in the ink vehicle. In some examples, the amount by weight of surfactant is about 0.01% to about 5%, or about 0.1% to about 5%, or about 1% to about 5%, or about 0.01% to about 1%, or about 0.1% to about 1%, or about 0.5% to about 1%, for example.

The biocide of the compensation vehicle may be selected from the list of biocides set forth above for the ink vehicle. In some examples in accordance with the principles described herein, the biocide is the same as that for the ink vehicle but it need not be. The amount of biocide in the compensation vehicle is an amount that obtains a biocidal effect. In some examples, the amount of the biocide in the compensation vehicle is related to the amount of biocide in the ink vehicle and, in some examples, the amount of biocide in the compensation vehicle corresponds to the amount of biocide in the ink vehicle. In some examples, the amount of biocide in the compensation vehicle is about 0.01% to about 2%, or about 0.1% to about 2%, or about 1% to about 2%, or about 0.01% to about 1%, or about 0.1% to about 1%, or about 0.5% to about 1%, for example.

The balance of the compensation vehicle is water. In some examples, the compensation vehicle may comprises water in an amount by weight of about 50% to about 95%, or about 50% to about 90%, or about 50% to about 85%, or about 50% to about 80%, or about 50% to about 75%, or about 60% to about 95%, or about 60% to about 90%, or about 60% to about 85%, or about 60% to about 80%, or about 60% to about 75%, or about 70% to about 95%, or about 70% to about 90%, or about 70% to about 85%, or about 70% to about 80%, or about 70% to about 75%, for example.

The phrase "overcoat liquid" refers to a liquid composition that is employed after the printing process to protect the printed image and to provide a certain ratio of gloss to haze to the printed image. The overcoat liquid comprises water and may comprise a wide variety of different components such as, but not limited to, one of more of polymeric binders, surfactants, solvents and co-solvents, nano-sized metal oxides, buffers, biocides, viscosity modifiers, sequestering agents, and stabilizing agents, for example.

The polymeric binder of the overcoat liquid is selected for its ability to impart high gloss to the printed image. The polymeric binder of the overcoat liquid may be selected from the list set forth above for the ink vehicle provided that the polymeric binder of the overcoat liquid and that of the ink vehicle and the compensation vehicle are not the same. In some examples in accordance with the principles described herein, the polymeric binder is, by way of illustration and not limitation, one of the JONCRYL® series (styrene acrylic acid copolymer from BASF Corporation, Port Arthur Tex.), RHOPLEX® series and LUCIDINE® series from Dow Chemical Company (Midland Mich.) and CARBOSET®, SANCURE®, and TURBOSET® series from Lubrizol Corporation (Wickliffe Ohio), for example. In some examples, an amount of the polymeric binder in the overcoat liquid is that amount which is required to form a uniform film that is at least 0.5 micron thick, for example. In some examples, the amount by weight of polymeric binder in the overcoat liquid is about 1% to about 30%, or about 1% to about 25%, or about 1% to about 20%, or about 1% to about 15%, or about 5% to about 30%, or about 5% to about 25%, or about 5% to about 20%, or about 10% to about 30%, or about 10% to about 25%, or about 20% to about 30%, or about 25% to about 30%, for example.

Nano-sized metal oxide particles may be employed in the overcoat liquid for the purpose of imparting scratch resistance to the printed image. In some examples, a refractive index for the nano-sized metal oxide particles is higher than that for an organic polymer. For example, the refractive index for metal oxides such as, e.g., ZnO and $Al_2O_3$ is greater than about 1.75 whereas the refractive index for typical organic polymers is about 1.42. The nano-sized metal oxide particles have a mean diameter of about 10 nm to about 200 nm, or about 10 nm to about 100 nm, or about 10 nm to about 50 nm, or about 20 nm to about 200 nm, or about 50 nm to about 200 nm, or about 100 nm to about 200 nm, for example. The metal of the metal oxide may be, but is not limited to, zinc, aluminum, bismuth, cerium, antimony, or tin, or combinations of two or more of the above. In some examples, the metal oxide is one or both of zinc oxide (e.g., ZN 2000® from Nanophase Technologies Corporation, Romeoville Ill.), and aluminum oxide (e.g., X1121W® from Nanophase Technologies Corporation), for example. The amount of the nano-sized metal oxide particles is dependent on a number of factors including, but not limited to, ink viscosity, print head reliability and required market segment print performance, for example. In some examples, an amount by weight of nano-sized metal oxide particles is about 0.5% to about 10%, or about 0.5 to about 5%, or about 0.5% to about 1%, or about 1% to about 10%, or about 1% to about 5%, or about 1% to about 2%, for example.

The organic solvent of the overcoat liquid may be selected from the list of organic solvents set forth above for the ink vehicle. The organic solvent of the overcoat liquid may have a chemical composition that is the same as or different from that of the ink vehicle and the compensation vehicle. An amount of the organic solvent in the overcoat liquid is dependent on a number of factors such as, for example, the nature and composition of an ink set, the nature and composition of a compensation vehicle, required print head performance, ink viscosity, and required market segment performance, for example. In some examples in accordance with the principles described herein, the amount by weight of organic solvent in the overcoat liquid is about 5% to about 30%, or about 10% to about 25%, or about 10% to about 20%, or about 10% to about 15%, or about 15% to about 30%, or about 15% to about 25%, or about 15% to about 20%, or about 20% to about 30%, or about 20% to about 25%, or about 25% to about 30%, for example.

The surfactant of the overcoat liquid may be selected from the list of surfactants set forth above for the ink vehicle. The surfactant of the overcoat liquid may have a chemical composition that is the same as or different from that of the ink vehicle and the compensation vehicle. The amount of the surfactant in the overcoat liquid is that amount which is necessary to provide a uniform wetting film without any significant image defect. In some examples, the amount by weight of surfactant in the overcoat liquid is about 0.2% to about 5%, or about 0.5 to about 5%, or about 1% to about 5%, or about 0.2% to about 1%, or about 0.2% to about 0.5%, or about 0.5% to about 4%, or about 0.5% to about 2%, or about 0.5% to about 1%, for example.

The biocide of the overcoat liquid may be selected from the list set forth above for the ink vehicle. The biocide of the overcoat liquid may have a chemical composition that is the same as or different from that of the ink vehicle and the compensation vehicle. The amount of biocide in the overcoat liquid is an amount that obtains a biocidal effect. In some examples, the amount by weight of biocide in the overcoat liquid is about 0.01% to about 2%, or about 0.1% to about 2%, or about 1% to about 2%, or about 0.01% to about 1%, or about 0.1% to about 1%, or about 0.5% to about 1%, for example.

The balance of the overcoat liquid is water. In some examples, the overcoat liquid may comprises water in an amount by weight of about 50% to about 95%, or about 50% to about 90%, or about 50% to about 85%, or about 50% to about 80%, or about 50% to about 75%, or about 60% to about 95%, or about 60% to about 90%, or about 60% to about 85%, or about 60% to about 80%, or about 60% to about 75%, or about 70% to about 95%, or about 70% to about 90%, or about 70% to about 85%, or about 70% to about 80%, or about 70% to about 75%, for example.

Figure 6:
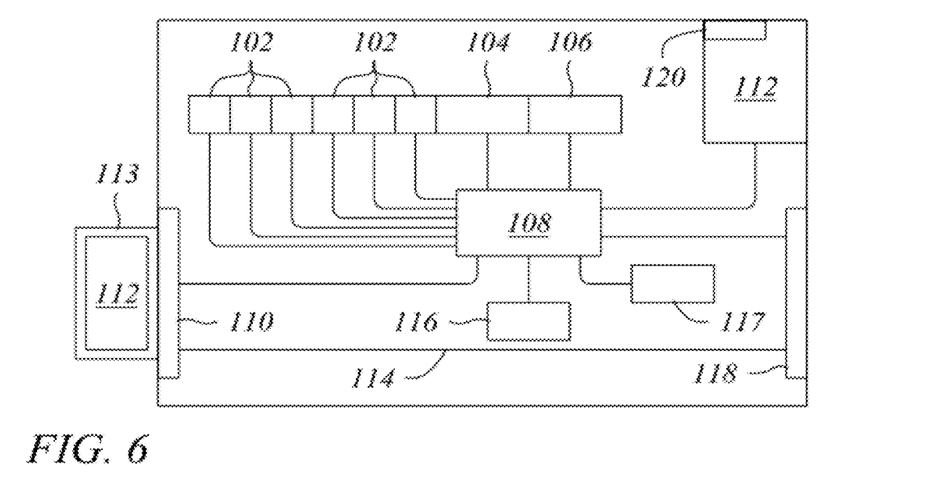
FIG. 6 is a schematic of an example of an apparatus for printing an image in accordance with an example of a method in accordance with the principles described herein.

Some examples in accordance with the principles described herein are directed to an apparatus for printing an image. Referring to FIG. 6, by way of illustration and not limitation, an apparatus 100 for printing an image comprises dispensers 102 for each ink of an ink set, a dispenser 104 for a compensation vehicle, a dispenser 106 for an overcoat liquid, and a controller 108 for the dispensers. The controller is programmed (i) to co-dispense the ink and the compensation vehicle to sites on a printing medium to form a printed image wherein a combined amount of the ink and the compensation vehicle dispensed to each site is at least substantially equal to a minimum site value that is predetermined for the ink set and the printing medium, and (ii) to apply an amount of an overcoat liquid to the printed image to obtain a predetermined ratio of gloss to haze. In some examples, the amount of overcoat liquid is a minimum amount. Apparatus 100 also comprises input 110 for receiving a sheet of a printing medium 112 in a media tray 113; drive 114 for transporting the printing medium for deposition of ink, compensation vehicle and overcoat liquid; drying elements 116 and 117 for drying liquid applied to the printing medium 112 and an output 118 for delivering a printed image to a customer. Apparatus 100 also comprises a reader 120 for reading digital image data from a customer and a computer 122, which receives and sends operation instructions or commands to the controller 108, which is programmed to carry out the instructions or commands.

In some examples, the controller 108 comprises a plurality of microprocessor-based or microcontroller-based modules for controlling the dispensers for each ink of the ink set, the dispenser for the compensation vehicle and the dispenser for the overcoat liquid. Both electrical components and embedded software are specifically tailored for the control function that each of the modules serves. The methods described in accordance with the principles herein may be adapted to embedded and supervisory computers, operating systems and runtime application-specific software.

In some examples, a customer inputs image data into reader 120, which communicates with computer 122. Instructions are sent to controller 108 from the computer 122. Controller 108 controls the operation of ink dispensers 102 and compensation vehicle dispenser 104 to dispense ink and compensation vehicle in accordance with pre-programmed instructions to dispense ink and compensation vehicle to create a printed image in accordance with the principles described herein. In some examples, computer 122 also sends instructions to input 110 via controller 108 to input a sheet of printing medium so that ink and compensation vehicle may be dispensed thereto to create a printed image in accordance with the principles described herein. The image may be created in one or more passes of the printing medium. Following creation of the image, in some examples, computer 122 instructs controller 108 to activate drying element 116, which dries the image. Next, overcoat liquid is applied from dispenser 106 as instructed by computer 122 communicating with controller 108, for example, to coat the printed image with overcoat liquid. Overcoat liquid may be applied in one or more passes of the printing medium. Following application of the overcoat liquid, in some examples, computer 122 instructs controller 108 to activate drying element 117, which dries the printed image prior to exiting through output 118.

Figure 7:
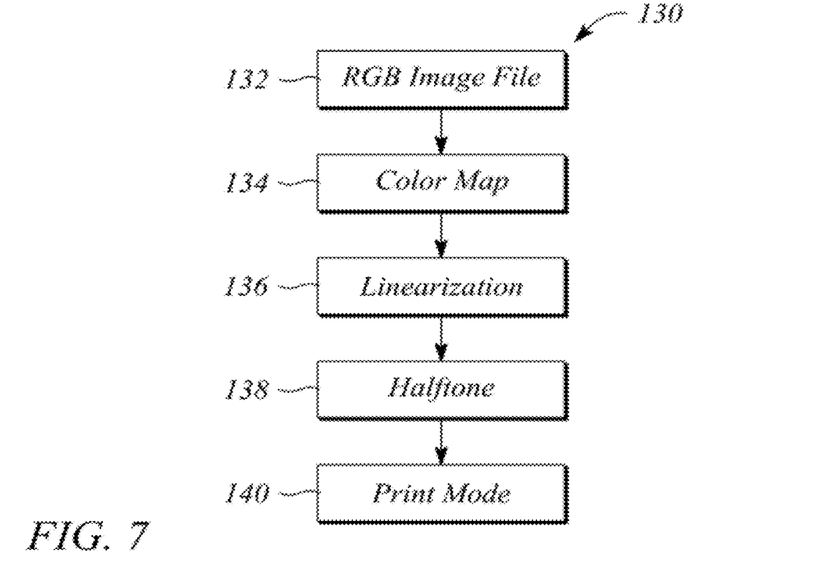
FIG. 7 is a flow chart depicting an example of an ink selection process for printing an image in accordance with the principles described herein.

FIG. 7 is a flow chart depicting an example of an ink selection process for printing an image in accordance with the principles described herein. The flow chart 130 shows acquisition of RGB image file (132) from which an amount of ink that is needed to print a given color (color map 134) is determined. Calibration adjustments are applied in a process of linearization (136) to normalize for pen/media variations. In halftone process (138), the number of drops that need to be printed per drop site is determined. The dispensers to be used at a certain printing pass are determined in print mode (140).

Figure 8:
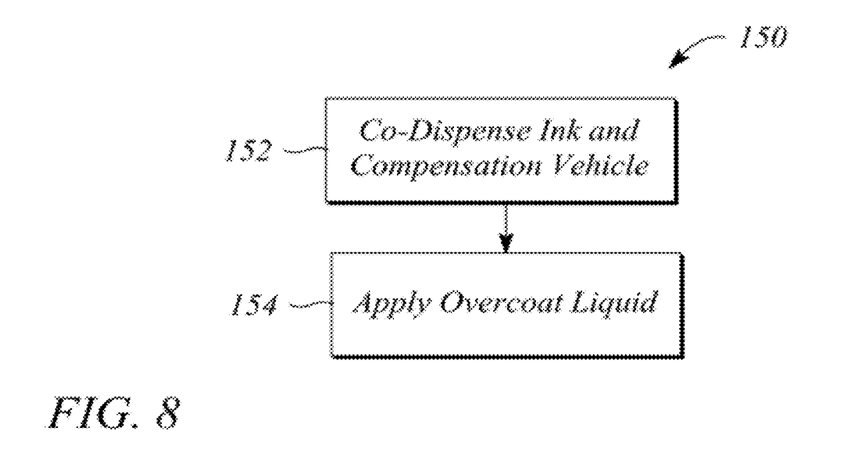
FIG. 8 is a flow chart depicting an example of a method of printing an image in accordance with the principles described herein.

FIG. 8 is a flow chart depicting an example of a method of printing an image in accordance with the principles described herein. In accordance with this of the method 150, a compensation vehicle and an ink from an ink set are co-example dispensed (152) to sites on a printing medium to form a printed image. A combined amount of the ink and the compensation vehicle dispensed to each site is at least substantially equal to a minimum site value that is predetermined for the ink set and the printing medium (see FIG. 9 and description below, for example). An amount of an overcoat liquid is applied (154) to the printed image to obtain a predetermined ratio of gloss to haze. In some examples, the amount of the overcoat liquid applied (154) is a minimum amount that is necessary to obtain the predetermined ratio of gloss to haze.

Figure 9:
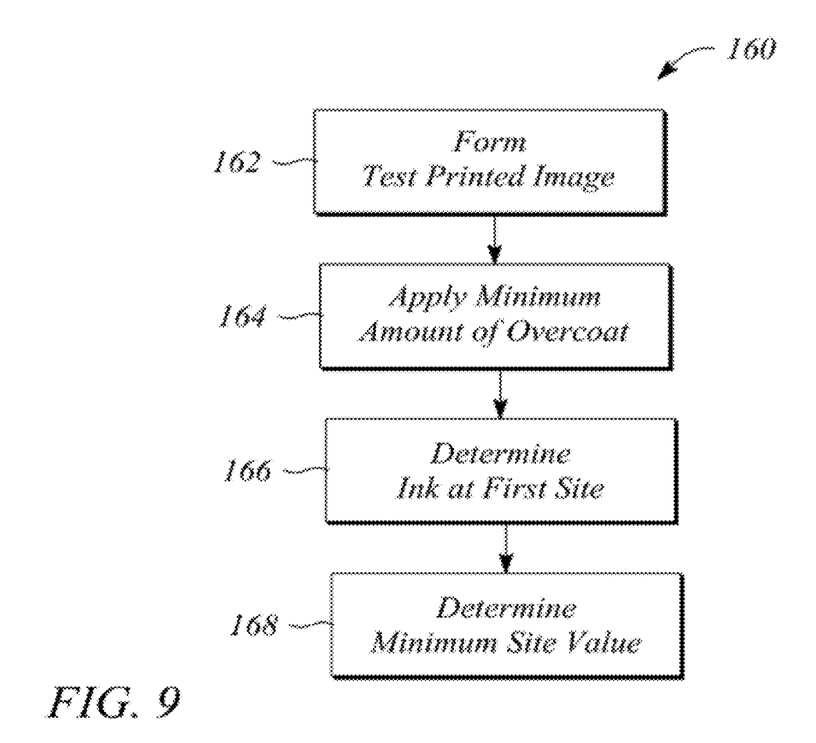
FIG. 9 is a flow chart depicting an example of a method of predetermining a minimum site value in accordance with the principles described herein.

FIG. 9 is a flow chart depicting an example of a method of predetermining a minimum site value in accordance with the principles described herein. In accordance with this example of the method 160, the minimum site value is predetermined (i.e., determined before the method (150) of printing an image of FIG. 8, for example) comprising dispensing ink from an ink set to the printing medium to form (162) a test printed image comprising sites of different light and dark colors, applying (164) an amount of an overcoat liquid to the test printed image that is just sufficient e.g., minimum amount) to obtain a predetermined ratio of gloss to haze for at least 40% of the sites, and determining (166) an amount of the ink at a site that first exhibits the predetermined ratio of gloss to haze (the first site) wherein consecutive sites after the first site exhibit a ratio of gloss to haze that differs by no more than about 20% from the predetermined ratio of gloss to haze. The minimum site value is determined (168) from the amount of ink at the first site. For example, the determined (168) minimum site value provides the predetermined minimum site value to the method 150 of printing an image of FIG. 8.

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited.

Numerical values, such as ratios, amounts, temperatures and time periods, for example, may be presented herein in a range format. It is to be understood that such range format is used merely for convenience and brevity and should be interpreted to include not only the numerical values explicitly recited as the limits of the range, but also to include all the individual numerical values or sub-ranges encompassed within that range as if each numerical value and sub-range is explicitly recited.

As used herein, the singular forms "a", "an" and "the" include plural referents unless the content clearly dictates otherwise. In some instances, "a" or "an" as used herein means either "at least one" or "one or more."

EXAMPLES

The following examples are by way of illustration and not limitation on the scope of the present disclosure and the appended claims. Numerous modifications and alternative compositions, methods, and systems may be devised without departing from the spirit and scope of the present disclosure. Unless otherwise indicated, materials in the experiments below may be purchased from Aldrich Chemical Company, St. Louis Mo. Parts and percentages are by weight unless indicated otherwise.

The following example is directed to a method as described above in accordance with the principles described herein that resulted in the graphs set forth in FIGS. 2-5. The ink set employed for printing the color matrix of FIG. 1 was the commercially available HP 771® ink set (Hewlett Packard, Palo Alto Calif.). The printer used to carry out the printing steps in the methods described in these examples was an HP DESIGNJET® Z3100 printer (Hewlett Packard).

The compensation vehicle employed in this example, which resulted in the graphs set forth in FIGS. 4 and 5, had the same composition as the composition of the ink vehicle of the HP 771® ink set without colorant. A formulation of a compensation vehicle was prepared and had the following composition: DANTOCOL® DHE (8%), 1-(2-hydroxyethyl)-2-pyrrolidone (1.5%), 1,2-hexanediol (0.5%), glycerol propoxylated (2%), triethanol amine (0.8%), SURFYNOL® 440 surfactant (0.35%), MEGAFACE® F444 surfactant (0.09%), PROXEL® GXL biocide (0.02%), KORDEK® MLX biocide (0.014%), and polyurethane resin (Dow Chemical Company) (1.2%) with the balance being water.

The composition of the overcoat liquid employed in this example was polymeric binder (either polyurethane resin or JONCRYL® 683 acrylic binder) (2%), 1,2-hexanediol (4%), 2-pyrrolidone (4%), LEG-1 (glycerol ethoxylated) (2%), SURFYNOL® CT-211 surfactant (0.65%), ZONYL® FSO (0.19%), nano-sized metal oxide (50 nm mean diameter) (either ZN® 2000 zinc oxide or X1121 W® aluminum oxide) (2%), and PROXEL® GXL biocide (0.2%) with the balance being water.

It should be noted that, when a compensation vehicle that had the same composition as the overcoat liquid above was employed in the above example for purposes of comparison and not in accordance with the principles described herein, no significant reduction in the amount of overcoat liquid applied to the printed image was realized.

It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A method of printing an image, the method comprising:
co-dispensing a compensation vehicle and an ink from an ink set to sites on a printing medium to form a printed image, wherein a combined amount of the ink and the compensation vehicle dispensed to each site is at least substantially equal to a minimum site value that is predetermined for the ink set and the printing medium; and
applying an amount of an overcoat liquid to the printed image to obtain a predetermined ratio of gloss to haze.

2. The method according to claim 1, wherein the compensation vehicle comprises one or more of an organic solvent, a polymeric binder, a surfactant and a biocide.

3. The method according to claim 1, wherein a composition of the compensation vehicle is substantially the same as a composition of an ink vehicle of the ink without a colorant.

4. The method according to claim 1, wherein a composition of the compensation vehicle is the same as a composition of an ink vehicle of the ink without a colorant.

5. The method according to claim 1, wherein a composition of the compensation vehicle and a composition of an ink vehicle of the ink without a colorant are substantially the same, and wherein the compensation vehicle comprises about 50% to about 95% by weight of water, about 10% to about 30% by weight of an organic solvent, and about 0.2% to about 5% by weight of a polymeric binder.

6. The method according to claim 1 wherein a composition of the overcoat liquid comprises about 50% to about 95% by weight of water, about 0.5% to about 10% by weight of a nano-sized metal oxide, about 5% to about 30% by weight of an organic solvent, and about 0.2% to about 5% of a polymeric binder.

7. The method according to claim 1, wherein a composition of the compensation vehicle and a composition of an ink vehicle of the ink without a colorant are substantially the same, and wherein the compensation vehicle comprises about 10% to about 15% by weight of an organic solvent, about 0.4% to about 0.5% by weight of a surfactant, about 0.03% to about 0.04% by weight of a biocide, and about 1.0% to about 2.0% by weight of a polymeric binder with the balance being water.

8. The method according to claim 1 wherein a composition of the overcoat liquid comprises about 1% to about 3% by weight of a nano-sized metal oxide, about 8% to about 12% by weight of an organic solvent, about 0.8% to about 0.9% by weight of a surfactant, about 0.1% to about 0.3% by weight of a biocide, and about 1% to about 3% of a polymeric binder with the balance being water.

9. The method according to claim 1 wherein the printing medium is photographic-quality paper, and wherein the printed image is comprised of colors for photographic printing.

10. The method according to claim 1 wherein the minimum site value is predetermined by a method comprising:
dispensing ink from the ink set to the printing medium to form a test printed image comprising sites of different light and dark colors;
applying an amount of the overcoat liquid to the test printed image that is just sufficient to obtain a predetermined ratio of gloss to haze for at least 40% of the sites; and
determining an amount of the ink at a first site that exhibits the predetermined ratio of gloss to haze, wherein consecutive sites after the first site exhibit a ratio of gloss to haze that differs by no more than about 20% from the predetermined ratio of gloss to haze, and wherein the minimum site value is determined from the amount of ink at the first site.

11. The method according to claim 10, wherein the minimum site value is equal to the amount of ink at the first site or is greater than or less than the amount of ink at the first site by no more than about 30%.

12. A method of controlling a gloss to haze ratio for a printed image, the method comprising adjusting an amount of a compensation vehicle co-dispensed with an ink to sites on a printing medium during the formation of the printed image.

13. The method according to claim 12, wherein the printed image is comprised of colors for photographic printing.

14. The method according to claim 12, wherein an increase in the amount of compensation vehicle co-dispensed with the ink results in an increase in the gloss to haze ratio.

15. A method of reducing an amount of overcoat liquid applied to a printed image to achieve a predetermined ratio of gloss to haze, the method comprising:
controlling a gloss to haze ratio for a printed image by the method according to claim 12; and
applying an amount of an overcoat liquid to the printed image to obtain the predetermined ratio of gloss to haze.

16. The method according to claim 15, wherein the printed image is comprised of colors for photographic printing.

17. The method according to claim 15, wherein an increase in the amount of the compensation vehicle co-dispensed with the ink results in an increase in the gloss to haze ratio.

18. An apparatus for printing an image, the apparatus comprising:
dispensers to dispense each ink of an ink set,
a dispenser to dispense a compensation vehicle,
a dispenser to dispense an overcoat liquid, and
a controller in communication with the respective dispensers, wherein the controller is programmed to:
co-dispense the ink and the compensation vehicle to sites on a printing medium to form a printed image, wherein a combined amount of the ink and the compensation vehicle dispensed to each site is at least substantially equal to a minimum site value that is predetermined for the ink set and the printing medium; and
apply an amount of an overcoat liquid to the printed image to obtain a predetermined ratio of gloss to haze.

19. The apparatus according to claim 18 which is a photo-kiosk printer.

20. The apparatus according to claim 18 which is an inkjet device.

* * * * *